US005185500A

United States Patent [19]

Spinner

[11] Patent Number: 5,185,500

[45] Date of Patent: Feb. 9, 1993

[54] INNER CONDUCTOR CONTACT FOR COAXIAL CABLES WITH BRAIDED INNER CONDUCTOR

[76] Inventor: Georg Spinner, Am Eichberg 12, 8152 Feldkirchen-Westerham, Fed. Rep. of Germany

[21] Appl. No.: 720,745

[22] Filed: Jun. 25, 1991

[30] Foreign Application Priority Data

Jul. 12, 1990 [DE] Fed. Rep. of Germany ....... 4022224

[51] Int. Cl.[5] .............................................. H02G 15/02

[52] U.S. Cl. ............................... 174/74 R; 174/75 C; 174/79; 174/88 C; 439/877; 206/223; 29/754

[58] Field of Search ...................... 174/74 R, 75 C, 79, 174/88 C, 113 C, 131 A, 105 R, 89; 439/578, 583, 584; 29/587

[56] References Cited

U.S. PATENT DOCUMENTS

| | | | |
|---|---|---|---|
| 2,479,483 | 8/1949 | Eklebery | 174/89 |
| 2,577,049 | 12/1951 | Uline | 174/74 R |
| 2,691,058 | 10/1954 | Millar | 174/74 R |
| 3,150,231 | 9/1964 | Clark | 174/88 C |
| 3,502,788 | 3/1970 | Albert | 174/88 C |
| 3,539,709 | 11/1970 | Brancaleone | 174/88 C |
| 3,598,895 | 8/1971 | Garland | 174/75 C |
| 3,701,086 | 10/1972 | Somerset | 174/88 C |
| 4,491,685 | 1/1985 | Drew et al. | 174/75 C |
| 4,704,498 | 11/1987 | Gregorac | 174/79 |

*Primary Examiner*—Morris H. Nimmo
*Attorney, Agent, or Firm*—Henry M. Feiereisen

[57] ABSTRACT

An inner conductor contact for connecting one end of a braided inner conductor of a coaxial cable with one end of an inner conductor of a coaxial plug, with the inner cable conductor enclosing a core which is retracted relative to the end of the inner cable conductor, includes a support element insertable in the inner cable conductor and having the same diameter as the core. The support element is adapted for connection with the core at the core-near side thereof via a bolt and with the inner plug conductor at the core-distant side thereof by means of a prolongation which is connected to the support element via a conical shoulder and thus is of smaller diameter than the support element. The part of the inner cable conductor extending along the shoulder and prolongation is surrounded by a metal bushing which receives the respective end of the inner plug conductor to provide the electric connection between the inner cable conductor and the inner plug conductor.

14 Claims, 2 Drawing Sheets

INNER CONDUCTOR CONTACT FOR COAXIAL CABLES WITH BRAIDED INNER CONDUCTOR

BACKGROUND OF THE INVENTION

The invention refers to an inner conductor contact, and in particular to an inner conductor contact for connecting one end of a braided inner conductor of a coaxial cable with one end of an inner conductor of a coaxial plug, with the inner cable conductor enclosing a core.

Conventional coaxial cables generally include a massive inner conductor, or an inner conductor made of litz wires or strands when high flexibility is demanded. Also known are coaxial cables which have an inner conductor woven about a core. The latter coaxial cables are generally used when transmitting high powers via a flexible cable and/or when requesting low attenuation because in this case only cables of great diameter are suitable. An inner conductor of litz wire would not be sufficiently flexible and too lossy in such circumstances.

In coaxial cables with braided inner conductor woven about a core, the latter is made either of a massive round plastic cord or of a stable plastic tube. Sometimes, also a complete coaxial cable is used as the inner conductor, however without insulating outer sheath so that the braided outer conductor of such a conventional coaxial cable (correspondingly smaller diameter) serves as inner conductor which is surrounded by the cable dielectric upon which the braided outer conductor is applied which in turn is enclosed by the insulating outer sheath.

A flexible coaxial cable of this type has the drawback that the contact i.e. electric (and mechanical) connection of the inner cable conductor with the cable-side part of the inner plug conductor is very difficult to accomplish. To date, either the inner cable conductor was soldered with the inner plug conductor or the connection was done by means of a collet chuck type device which is externally clamped upon the braided inner cable conductor. This type of connection represents, however, an area of electric discontinuity because the diameter of the collet chuck exceeds the diameter of the inner cable conductor. Even though it may be feasible, e.g. by increasing the diameter of the outer conductor, to essentially keep the characteristic impedance in the contact area constant so that the reflection in the contact area is kept within an acceptable range, the diametric jump still decreases the cutoff frequency of the arrangement of cable and plug compared to the cutoff frequency of the cable.

SUMMARY OF THE INVENTION

It is thus an object of the present invention to provide an improved inner conductor contact of the type set forth above obviating the afore-stated drawbacks.

In particular, it is an object of the present invention to provide an improved inner conductor contact which is low on reflections and does not negatively influence the cutoff frequency.

These objects and others which will become apparent hereinafter are attained in accordance with the present invention by providing a metallic, generally cylindrical support element which is insertable in the inner cable conductor and is adapted for connection with the core at the core-near side thereof and with the inner plug conductor at the core-distant side thereof, and by a metal bushing which surrounds the end of the inner cable conductor and receives the respective end of the inner plug conductor.

Preferably the core-near side of the support element is provided with a bolt which is threadably connected with the core. At the core-distant side thereof, the support element is extended via a conical shoulder by a prolongation of smaller diameter than the support element, with the inner cable conductor being lined over the shoulder and prolongation and surrounded by the metal bushing. The end of the inner plug conductor is threadably connected to the prolongation, with the metal bushing being interposed between the inner cable conductor and the inner plug conductor.

In order to prevent a radial widening of the core during insertion of the support element and threaded engagement of the bolt with the core, the assembly of the inner conductor contact includes a sleeve which has an inner diameter corresponding to the outer diameter of the braided inner cable conductor and which is placed over the inner cable conductor before screwing the bolt of the support element with the core. In addition, the assembly kit includes a clamping device for preventing a torsion of the inner cable conductor when threadably engaging the inner plug conductor to the prolongation of the support element, with the clamping device having a cylindrical bore with an inner diameter corresponding to the outer diameter of the braided inner cable conductor.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
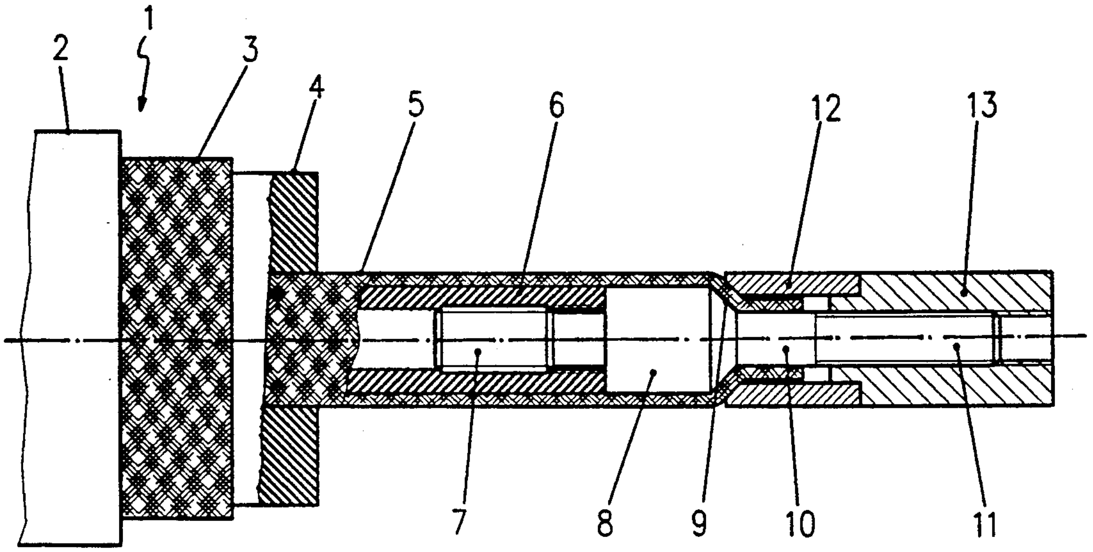
FIG. 1 is a partly longitudinal section of one embodiment of an inner conductor contact according to the present invention.

Throughout all the Figures, the same or corresponding elements are generally designated by the same reference numerals unless indicated otherwise.

Referring now to the drawing and in particular to FIG. 1, there is shown a partly longitudinal section of one embodiment of an inner conductor contact according to the present invention for connecting a highly flexible coaxial cable, which is characterized by low attenuation and applicable for transmitting high powers, with a plug. The coaxial cable is generally designated by reference numeral 1 and includes a braided outer conductor 3 which is enclosed by an insulating outer protective sheath 2 and insulated from a centered inner conductor 5 by a dielectric 4. The inner conductor 5 is of the braided type and encloses a core 6 in form of a plastic tube.

For attaining the connection of the coaxial cable 1 with a plug, and in particular the contact of the inner cable conductor 5 with the inner plug conductor 13, the respective end of the coaxial cable is suitably prepared. It will be appreciated that the connection of the outer conductor of coaxial cable 1 with the outer conductor of the plug is not part of the present invention and thus a detailed description thereof is omitted for sake of simplicity.

In order to provide the inner conductor contact, the core 6 is initially shortened relative to the plug-facing (right-hand) axial end of the inner conductor 5. This is accomplished by pushing back the braided inner conductor 5 until a suitable section of the core 6 is exposed and by severing the exposed part of the core. Thereafter, the braided inner conductor 5 is returned to its original position or original length so as to extend beyond the core 6 and to define a free space. Inserted in this free space of the braided inner conductor 5 is a preferably metallic, cylindrical support element 8 which is extended at its core-near side with a bolt 7. By means of the bolt 7, the support element 8 is fixed in the core 6 which in the embodiment of FIG. 1 is of tubular configuration. Depending on the type of core 6, the bolt 7 may be smooth or threaded, with the thread being self-cutting, grooving or rolling. As clearly shown in FIG. 1, the support element 8 bears against the core 6 and has an outer diameter which corresponds to the outer diameter of the core 6 so that no diametric jump is obtained in the area of the braided inner conductor 5.

Figure 2:
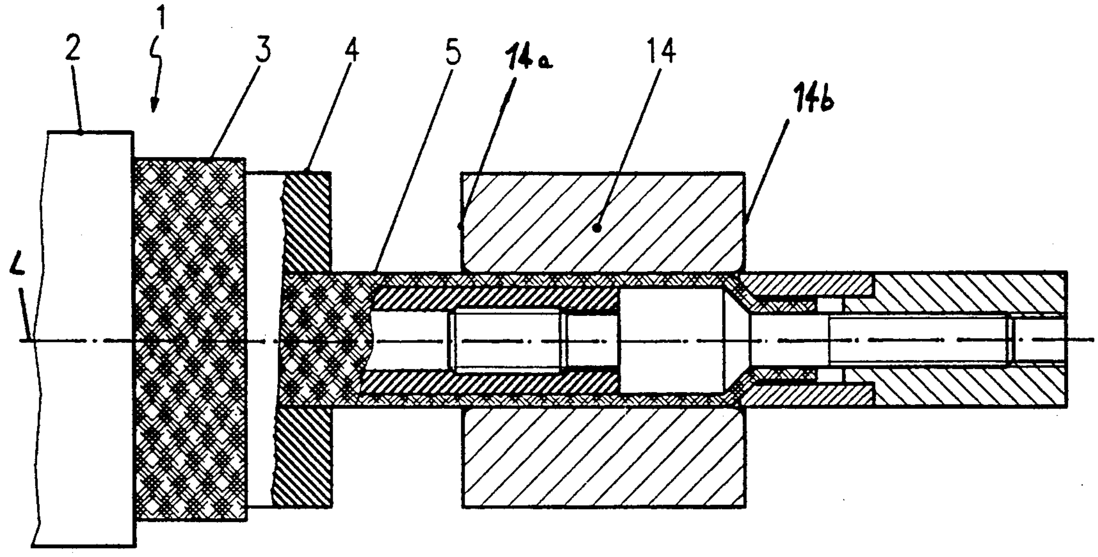
FIG. 2 is a partly longitudinal section of the inner conductor contact according to FIG. 1, illustrating in detail the use of a first mounting device for assembling the inner conductor contact.
Figure 3:
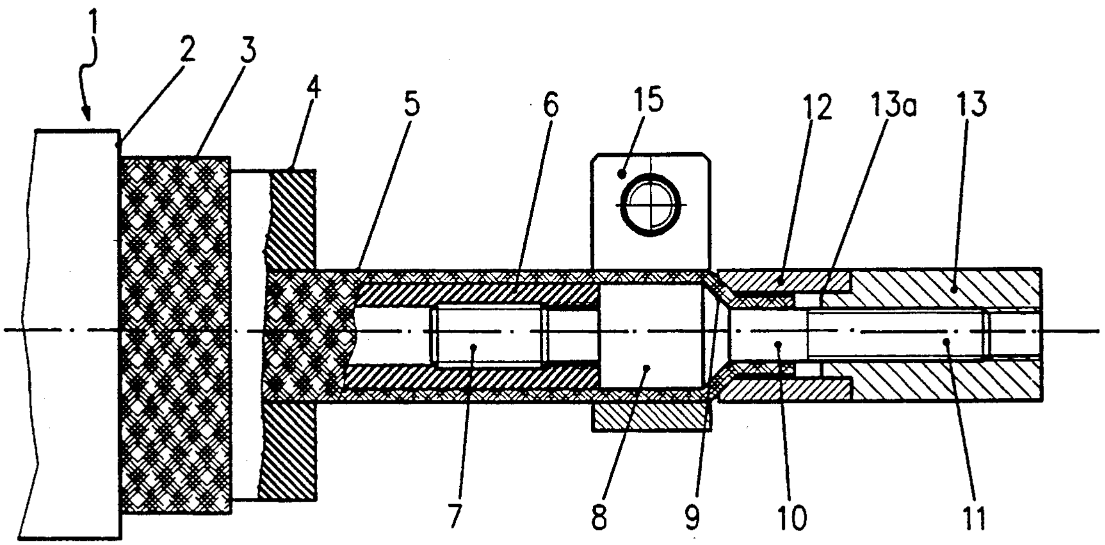
FIG. 3 is a partly longitudinal section of the inner conductor contact according to FIG. 1, illustrating in detail the use of a second mounting device for assembling the inner conductor contact.

In order to prevent the core 6 from widening in radial direction during insertion of and threaded engagement with the support element 8, it is preferred to use a sleeve 14 as mounting device as shown in FIG. 2. The axial length of the sleeve 14 is suitably dimensioned such that upon bearing against the dielectric 4 with one end face 14*a*, the opposing end face 14*b* of the sleeve 14 defines the plane in which the core 6 is cut off to create the space for receiving the support element 8, as previously set forth. By slipping the sleeve 14 over the inner conductor 5 during preparation of the plug-facing end of the inner conductor 5, the inner conductor 5 and the core 6 are generally kept in parallel relationship with the longitudinal axis L of the coaxial cable 1 and a radial widening thereof is prevented.

At its core-distant side, the support element 8 is provided with a conical shoulder 9 and further elongated by a prolongation 10 which is thus of smaller diameter than the diameter of the support element 8. The prolongation 10 is provided with an external thread 11 at its axial end distant to the support element 8. After positioning the support element 8 and threadably engaging the bolt 7 with the core 6, the inner conductor 5 is pulled over the shoulder 9 and over the prolongation 10. If required, the inner conductor 5 can be attached to the prolongation 10 e.g. by a bundle of wire, i.e. several, adjoining coils of a thin wire (not shown). As shown in FIG. 1, the end of the inner conductor 5 has thus a bottleneck-like configuration which faces the plug and which is suitable for allowing interposing of a metal bushing 12 of same outer diameter as the outer diameter of the braided inner conductor 5. The metal bushing 12 is slipped over the narrowed end of the inner conductor 5 and provided with a conical end face which is complementary to the conical surface of the shoulder 9.

After placing the metal, bushing 12 over the end of the inner conductor 5, the inner plug conductor 13, which is only illustrated by the cable-facing portion and which is provided with an internal thread meshing with the external thread of the prolongation 11, is threadably engaged with the prolongation 11 of the support element 8. Through threadably engaging the inner plug conductor 13 with the support element 8, the inner cable conductor 5 is sandwiched between the shoulder 9 of the support element 8 and the opposing end face of the metal bushing 12 so as to attain a mechanical clamping of the inner cable conductor 5 as well as an intimate electric contact between the inner cable conductor 5 and the inner plug conductor 13.

Suitably, the axial cable-near end of the inner plug conductor 13 includes a centering collar 13*a* which engages in the metal bushing 12 to allow accurate positioning of the inner plug conductor 13 within the metal bushing 12. Persons skilled in the art will appreciate that also other means for attaining a centered position of the inner plug conductor 13 within the metal, bushing 12 are feasible and should be considered within the scope of the present invention.

The sleeve 14 as shown in FIG. 2 is suitably placed over the inner cable conductor 5 before attaching the metal bushing 12. However, it will be appreciated by persons skilled in the art that it is certainly feasible that under certain geometric conditions the sleeve 14 may also be removed after the inner plug conductor 13 has been attached.

In order to prevent a torsion of the braided inner conductor 5 as well as of the core 6 and support element 8 when the attachment of the inner plug conductor 13 with the prolongation 11 requires a greater tightening torque, it is preferred to use a clamping device such as a clamping jaw 15 which includes a cylindrical bore with an inner diameter corresponding to the outer diameter of the inner cable conductor 5. The operation of such a clamping jaw 15 is known per se so that a detailed description of its operation is omitted for sake of simplicity.

Figure 4:
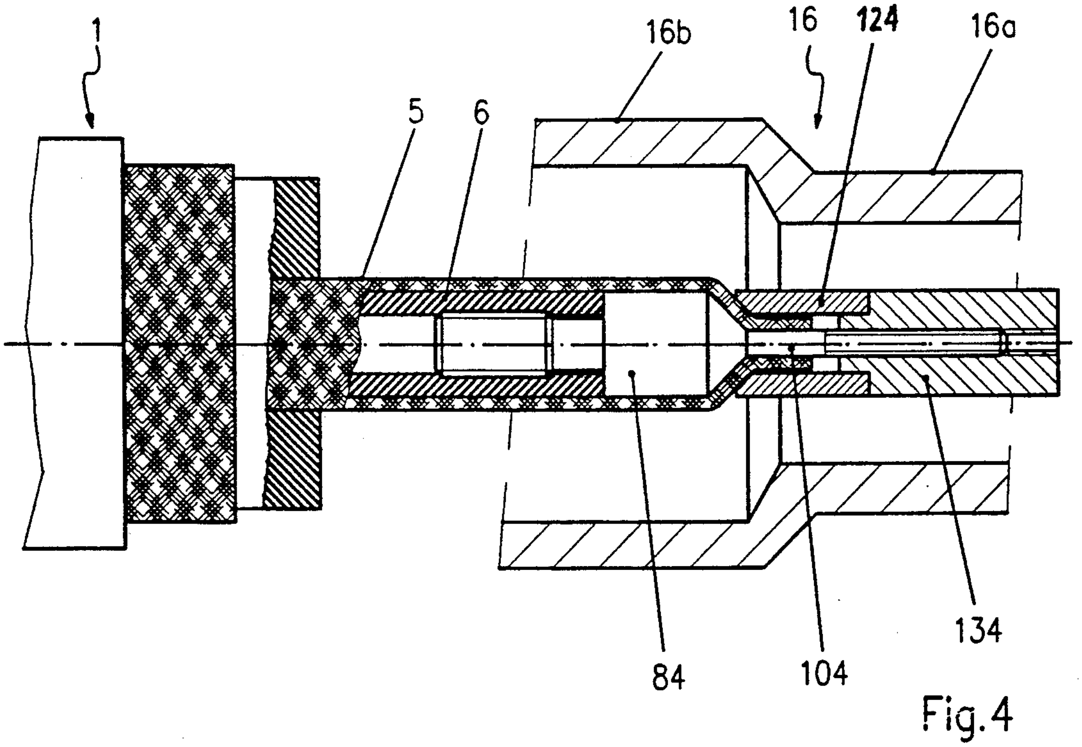
FIG. 4 is a partly longitudinal section of another embodiment of an inner conductor contact according to the present invention.

Turning now to FIG. 4, there is shown a partly longitudinal section of a second embodiment of an inner conductor contact in accordance with the present invention for connecting the inner cable conductor 5 with an inner plug conductor 134 of smaller diameter. Thus, a plug connector of smaller overall diameter or outer diameter may be used as can be clearly seen from the schematic illustration of the plug outer conductor 16 of FIG. 4, which includes a cable-distant portion 16*a* of smaller diameter compared to the cable-near portion 16*b*. The use of such a plug connector is especially advantageous when desiring a particular low attenuation. The difference between the inner conductor contact of FIG. 4 and the inner conductor contact as illustrated in FIG. 1 resides in the use of a modified support element 84, which has a prolongation 104 of suitably smaller diameter, and in modified a metal bushing 124 and inner plug conductor 134 which are of smaller diameter. Thus, the outer diameter of the metal bushing 124 is smaller than the outer diameter of the braided inner conductor 5.

While the invention has been illustrated and described as embodied in an inner conductor contact for coaxial cables with braided inner conductor, it is not intended to be limited to the details shown since various modifications and structural changes may be made without departing in any way from the spirit of the present invention.

What is claimed as new and desired to be protected by Letters Patent is set forth in the appended claims:

I claim:

1. An inner conductor contact for connecting one end of a braided inner conductor of a coaxial cable with one end of an inner conductor of a coaxial plug, with said inner conductor of the cable enclosing a core which is retracted relative to said end of said inner conductor of the cable, said inner conductor contact comprising:

a generally cylindrical metallic support element insertable in a braided inner conductor of a coaxial cable and having a diameter corresponding to the diameter of a retracted core of the cable enclosed by said conductor of the cable, said support element being extended via a shoulder by a prolongation of smaller diameter, with said inner conductor of the cable surrounding said shoulder and a portion of said prolongation; and a metal bushing for surrounding said inner conductor of the cable in the area of said shoulder and said prolongation, with an inner conductor of a coaxial plug having a centering collar engageable in said metal bushing, said inner conductor of the plug being threadably engageable with said support element for providing a clamping of said inner conductor of the cable between said shoulder and the respective end face of said metal bushing.

2. An inner conductor contact as defined in claim 1 wherein said shoulder of said support element is defined by a conical surface.

3. An inner conductor contact as defined in claim 1 wherein said metal bushing has an outer diameter and said inner conductor of the cable has an outer diameter, said outer diameter of said metal bushing corresponding to said outer diameter of said inner conductor of the cable.

4. An inner conductor contact as defined in claim 1 wherein said metal bushing has an outer diameter and said inner conductor of the cable has an outer diameter, said outer diameter of said metal bushing being smaller than said outer diameter of said inner conductor of the cable.

5. An inner conductor contact as defined in claim 1 wherein said support element has a core-near side and a core-distant side, said support element including a bolt which projects in axial direction of the support element from said core-near side and engages a recess of said core.

6. An inner conductor contact as defined in claim 5 wherein said bolt has an external thread.

7. An inner conductor contact as defined in claim 1 wherein said prolongation of said support element includes an external thread engaged by an internal thread of said inner conductor of the plug.

8. A kit for assembling an inner conductor contact by which one end of a braided inner conductor of a coaxial cable is connected with one end of an inner conductor of a coaxial plug, with the inner conductor of the cable enclosing a core with its axial end being retracted relative to said end of said inner conductor of the cable, said kit comprising:

a support element insertable in a braided inner conductor of a coaxial cable and adapted for connection to a retracted core of the cable enclosed by said inner conductor of the cable; and a sleeve adapted for placement over said inner conductor of the cable to prevent a radial widening of said core upon insertion of said support element, said sleeve having a inner diameter corresponding to the outer diameter of said braided inner conductor of the cable and an axial length by which said axial end of said core is defined.

9. A method of connecting one end of a braided inner conductor of a coaxial cable with one end of an inner conductor of a coaxial plug, with the inner conductor of the cable enclosing a core, comprising the steps of:

shortening the core of a coaxial cable relative to the end of an inner conductor of the cable enclosing the core;

inserting a support element in the inner cable conductor and attaching the support element to the core of the cable;

aligning the inner conductor of the cable along the support element and placing a metal bushing over the end of said inner conductor of the cable; and connecting an inner conductor of a plug with the inner conductor of the cable by centering and engaging said inner conductor of the plug in the metal bushing and threadably engaging the end of the inner conductor of the plug with the support element so as to attain a clamping of the inner conductor of the cable between the support element and the metal bushing.

10. A method as defined in claim 9 wherein said shortening step includes pushing back the end of the inner conductor of the cable to expose the core, cutting off the exposed portion of the core and returning the inner conductor of the cable to its initial position.

11. A method as defined in claim 9, and further comprising the step of placing a sleeve over the inner conductor of the cable before said inserting step and removing the sleeve prior to said aligning step.

12. A method as defined in claim 9, and further comprising the step of placing a sleeve over the inner conductor of the cable before said inserting step and removing the sleeve after said connecting step.

13. A method as defined in claim 9, and further comprising the step of sliding a sleeve over the end of the inner conductor of the cable prior to said shortening step for defining a plane in which the core is to be cut off to shorten it relative to the end of the inner conductor of the cable and for preventing a radial widening of the core during attachment of the support element to the core.

14. A method as defined in claim 9, and further comprising the step of placing a clamping device upon said inner conductor of the cable prior to said connecting step for preventing a torsion of the inner conductor of the cable and the support element when threadably engaging the inner conductor of the plug with said support element.

* * * * *